Patented Sept. 1, 1942

2,294,381

UNITED STATES PATENT OFFICE 2,294,381

TREATMENT OF PIGMENTS WITH AMMONIUM NAPHTHENATE

Harold E. Burdick, Huntington, W. Va., assignor to E. I. du Pont de Nemours & Company, Wilmington, Del., a corporation of Delaware No Drawing. Application August 5, 1940, Serial No. 351,555

4 Claims. (Cl. 106—298)

This invention relates to the manufacture of pigments and more particularly to the manufacture of dry pigments of improved texture. Still more particularly it relates to the manufacture of dry pigments with greatly improved ease of dispersion in organic vehicles.

The processes of manufacturing dry pigments by precipitation from aqueous solutions, filtering, washing free from soluble salts, drying, and finally grinding to a fine powder are well known in the art. To a very large extent, the subsequent use of these pigments involves their incorporation into vehicles, principally of an organic nature, for use as decorative and protective media in coating compositions. It is obvious that the value of the pigments for these purposes will depend to a large extent on the degree of dispersion in the vehicle. The ideal dispersion for any given pigment appears to be that in which it is broken down substantially to the primary particles which were formed during the precipitation process.

Most pigments undergo a certain amount of aggregation during the various processing steps, particularly during the drying when more or less cementation of the particles appears to take place. The breaking down of these aggregates to reach the ultimate desired degree of dispersion in the vehicle is usually effected in two steps, the first being dry grinding to a fine powder and the second being the incorporation, or the grinding, of the pigment into the vehicle. Each of these steps requires the expenditure of a relatively large amount of energy and methods of reducing this expenditure of energy have been long sought after.

Pigments appear to differ widely in the difficulty of their dispersion in vehicles. Certain pigments such as iron blues, phthalocyanine pigments, vat dye pigments, para red, and the like have been well known in the art as being very difficult to grind to a reasonably fine state of subdivision. With certain other pigments the difficulty is much less pronounced but it is believed that most, if not all, of the commonly used pigments require some grinding to disperse them in the usual organic vehicles.

Various methods of solving these difficulties have been proposed in the past. For instance, there are some more or less related methods using volatile agents which have been added, usually to the aqueous paste, before drying. Thus on the one hand, water immiscible volatile liquids such as toluene have been used and in another instance certain water miscible solvents such as the mono butyl ether of ethylene glycol have been used. Experience has shown that these prior art processes are somewhat limited in their application. Furthermore, the processes tend to be expensive because of the necessity of using elaborate recovery systems to prevent the loss of treating agents which do not add to the yield of the pigment.

This invention has as an object the production of pigments of improved texture. A further object is to improve the ease of dispersion of pigments in vehicles. Additional objects will become apparent from a consideration of the following description and claims.

These objects are attained according to the herein described invention which broadly comprises mixing with an aqueous suspension of the pigment, prior to the removal of water by drying, ammonium naphthenate.

In describing this invention, it is necessary to describe a means of measuring the results obtained by its application. The degree of dispersion of a pigment in a vehicle, resulting from a grinding operation, may be demonstrated through the examination of at least two measurable properties. One of these is generally known as the "rate of strength development" and is a measure of the amount of grinding required to develop the maximum tinting strength or the ability to color a pigment of contrasting shade, e. g., the ability of a colored pigment to tint a white pigment in the same vehicle. The other measurable property is the amount of "grit" or the relative number and size of all particles which can be seen by the unaided eye in a thin film of the coating composition. Although these properties are related up to a certain point, experience has shown that in the final stages of dispersion they are largely independent and each highly important.

The importance of the development of the maximum tinting strength of a color is largely economic since it is reflected in the money value of the pigment to the user. Likewise, the rate of strength development is also important to the user, since it determines largely the amount of grinding necessary to develop the maximum tinting strength. The tinting strength of a colored pigment is easily measured by adding a predetermined amount of a pigment dispersed in a vehicle to a white coating composition. The rate of strength development is also easily measured by taking samples of the pigment-oil composition at various stages of the grinding and comparing the strength to the ultimate strength obtained by continued grinding.

The presence of grit in a coating composition is reflected in a number of ways in the use of the same. For instance, in the use of paints and enamels, grit may result in poor gloss in the dry film. In printing ink, grit tends to fill the fine screen of high grade printing plates so that they function poorly. In the measurement of grit, the method described by T. J. Craig in "The American Ink Maker," October and November issues (1938), may be used to evaluate the pigment. In this method, printing inks are made by grinding the pigments into a suitable vehicle, such as a lithographic varnish, on a roller mill with a controlled setting of the clearance between the rolls. Samples of the ink can be taken after any desired number of passes over the mill and the inks are evaluated by pulling down a wedge of ink on a glass slide as more fully described by Craig in the above reference. Arbitrary standards have been established in which the number 20 has been assigned to an ink which is free from any grit that can be detected with the unaided eye and 11 has been assigned to an ink which shows a very large amount of grit. The intervening numbers have been assigned in such a way as to represent approximately equal gradations in the amount of grit. Although these ratings are on a purely arbitrary basis, nevertheless, when suitable standards for comparison are available and the grinds are made under controlled conditions, they are readily duplicable and are considered to represent an accurate measure of the ease with which the pigment may be incorporated into the vehicle.

In most of the examples which follow hereafter the grit ratings were made on inks which had been given two passes over a loosely set roller mill, the clearance of the roll having been adjusted to a substantially reproducible point with the aid of feeler gauges. This represents, in general, a very superficial grinding operation and improvements in the rating should be reflected in real value to the user of the pigment.

In the addition of the treating agent to aqueous suspensions of pigments, it is generally preferred to add them to the slurries prior to any filtration step since thorough agitation and mixing are much more readily effected at this stage. However, in some cases this procedure is impossible because of the solubility of the treating agent and its consequent elimination during the filtration operation and it is then necessary to add the agent to the paste just prior to drying. It is understood that either procedure is applicable to this invention.

This invention may be more readily understood from an examination of the following examples which are given for purposes of illustration and are not intended to place any restrictions or limitations on the herein described invention. In all cases parts are by weight.

*Example I*

240 parts of sodium ferrocyanide

was dissolved in 2000 parts of water at 120° F. In a separate container 144 parts of copperas ($FeSO_4.7H_2O$), 68.6 parts of $(NH_4)_2SO_4$ and 11.6 parts of $H_2SO_4$ (100%) were dissolved in 2400 parts of water at 194° F. The copperas mixture was added to the sodium ferrocyanide solution over a period of 15 minutes with vigorous agitation. The temperature was then adjusted to 176° F. and a solution of 58.2 parts of $H_2SO_4$ (100%) in 300 parts of water was added. The mixture was then stirred for two hours at 176° F. and finally oxidized with a solution of 12 parts sodium chlorate ($NaClO_3$) in 100 parts of water and the agitation continued for approximately two hours at 176° F. It was then diluted to a total of about 20,000 parts, washed once by decantation, filtered and washed substantially sulfate free. It was finally dried in an oven at moderate heat. The yield was 151 parts which gave a grit rating of 13.

*Example II*

After washing by decantation, a portion of the slurry of Example I was heated to 176° F. and a solution of ammonium naphthenate, prepared by dissolving 14 parts of naphthenic acid in 60 parts of water containing 3.6 parts of aqua ammonia (26° Bé.), was added, the mixture stirred for some time (two hours or more), filtered, washed and dried as above.

Yield 160 parts. Grit rating 15.

Example I above illustrates the preparation of a typical Iron Blue. Various means of altering the shade thereof to give darker or lighter mass tones, and greener or redder tints, are well known to the art. Since the methods of manufacture of the pigments is no part of this invention they will not be further discussed.

*Example III*

A Milori Blue finished slurry equivalent to 100 parts of dry pigment was treated with ammonium naphthenate, obtained by reacting 6.8 parts of naphthenic acid with a solution of 1.75 parts of aqua ammonia 26° Bé. in 30 parts of water, and stirred overnight. It was then filtered, washed repeatedly with warm water and finally dried in an oven at a moderate temperature. The grit rating of a printing ink made therefrom was 17 compared to 15 for the untreated control.

*Example IV*

An Iron Blue presscake of about 20% solids content was thoroughly mixed with about 3%, based on the weight of the dry pigment, of ammonium naphthenate and dried in an oven. Tests for grit gave a rating of 18 as compared to 16 for the untreated control.

*Example V*

A light shade chrome green was made by mixing washed slurries of chrome yellow (lead chromate-lead sulfate) and Iron Blue in the proportions of about 96% yellow and 4% blue. A portion of this green slurry containing about 100 parts of dry color was treated with about 13 parts of ammonium naphthenate at room temperature, stirred a short time, filtered and dried in an oven. The pigment was ground in a bodied linseed oil on a three roller mill with the rolls set quite loosely. The resulting mill base exhibited a grit rating of 16 as compared to 14 for an untreated control.

*Example VI*

1150 parts of a paste of copper phthalocyanine (equal to 300 parts of dry pigment) was reslurried with about 3000 parts of water and 5 parts of ammonium naphthenate was added thereto. The mixture was then given 3 passes through a colloid mill and dried on trays in an oven. The very soft fluffy powder gave an ink with lithographic varnish which exhibited a grit rating of 19 as compared to 15 for an untreated control. Furthermore, the ink developed substantially full strength on 2 passes through a loosely set ink mill whereas the control developed only about 90% of its strength under the same conditions.

Example VII 278 parts of an 18% paste of a maroon pigment, comprising the manganese salt of the azo dye obtained by coupling diazotized 2-naphthylamine-1-sulfonic acid with 2-hydroxy-3-naphthoic acid, was reslurried with 250 parts of water. Ammonium naphthenate obtained by reacting 1.5 parts of naphthenic acid with a solution of 0.4 part of concentrated aqua ammonia in 6.5 parts of water was added to the mixture with vigorous agitation and the whole given three passes through a colloid mill. The resulting slurry was of cream-like consistency and was dried on trays in an oven to give a very soft fluffy dry product. A control containing no treating agent was very hard and compact. Printing inks from the treated product showed a grit rating of 17 compared to 12 for the untreated control.

It is to be understood that the herein described specific embodiments of this invention may be subjected to variation and modification without departing from the scope and spirit of this invention. Thus, the method of preparing the pigment is not a part of this invention. The treatment may be applied to unwashed slurries, to washed slurries, and to press cakes. The optimum point of addition is not necessarily the same for all pigments but it is readily determined by one skilled in the art.

Although the treatments have been described with iron blues, chrome greens, phthalocyanine pigments, and an azo maroon, it is to be understood that the invention is not limited thereto since it applied broadly to the treatment of all pigments. Thus, it may be applied to such varied types of pigments as chrome yellows, azo pigments, vat dye pigments, titanium oxide pigments, and the like. In the case of pigments which are calcined during manufacture the treatment should be applied subsequent to calcination in order to prevent the destruction of the organic treating agent by the high temperatures.

The amount of agent employed is not critical and can be varied over a wide range. Economic considerations limit the practical use in two ways. First, the agents increase the cost of the pigments and the minimum increase is desirable; and secondly a large amount of agent exerts undesirable effects on the pigments and properties other than texture which is invariably improved. Thus, although 50%, based upon the weight of dry pigment, of ammonium naphthenate causes a pigment to exhibit better texture than is given by 10% of the agent, there is a substantial loss in strength which more than offsets the better texture for most users. An amount of agent between about 0.5% and about 15%, based upon the weight of the dry pigment, and preferably between about 1% and about 7% is recommended.

The other details of processing such as temperature of materials during the treatment, the time and type of agitation, the conditions of drying and the like are not, generally speaking, critical and, where optima exist, they are readily determined by experiments which are within the skill of the worker in the art.

It is believed that poor texture in pigments results, generally, from aggregation and cementation of primary particles. The agent of this invention appears to function as if it coated the primary particle with a film which prevented firm cementation so that the particles may be separated with a very small amount of work being done on them.

The advantages of this invention are manifest in the improved texture of pigments made by this process. This improved texture results in superior coating compositions characterized by a minimum or complete absence of grit and the development of full color strength with a minimum of grinding.

The advantages to the user of the pigment are manifested in the superior quality of the resulting products and in a substantial increase in the rate of production, resulting both from a decrease in the number of times it is necessary to pass the material over the mill and from the ability to run a thicker film of material on the mill since it is unnecessary to set the rolls as closely as has heretofore been needed.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process for the production of pigments of improved texture which comprises mixing with an aqueous suspension of a colored pigment, prior to the removal of water by drying, between about 1% and about 7%, based upon the weight of the pigment, ammonium naphthenate.

2. A process for the production of pigments of improved texture which comprises mixing with an aqueous suspension of an iron blue pigment, prior to the removal of water by drying, between about 1% and about 7%, based upon the weight of the pigment, of ammonium naphthenate.

3. A process for the production if pigments of improved texture which comprises mixing with an aqueous suspension of a chrome green pigment, prior to the removal of water by drying, between about 1% and about 7%, based upon the weight of the pigment, of ammonium naphthenate.

4. A process for the production of pigments of improved texture which comprises mixing with an aqueous suspension of a phthalocyanine pigment, prior to the removal of water by drying, between about 1% and about 7%, based upon the weight of the pigment, of ammonium naphthenate.

HAROLD E. BURDICK.

CERTIFICATE OF CORRECTION.

Patent No. 2,294,381. September 1, 1942.

HAROLD E. BURDICK.

It is hereby certified that error appears in the printed specification of the above numbered patent requiring correction as follows: Page 2, first column, line 67, before the formula insert a parenthesis; page 3, second column, line 47, claim 1, before "ammonium" insert --of--; line 54, claim 3, for "if" read --of--; and that the said Letters Patent should be read with this correction therein that the same may conform to the record of the case in the Patent Office.

Signed and sealed this 20th day of October, A. D. 1942.

Henry Van Arsdale,
Acting Commissioner of Patents.

(Seal)